H. M. CROWLEY.
VEHICLE WHEEL.
APPLICATION FILED AUG. 14, 1917.

1,272,920.

Patented July 16, 1918.
2 SHEETS—SHEET 1.

Witnesses
R. Harwood
C. R. Ziegler.

Inventor
Harold M. Crowley.
By Joshua R. H. Potts
His Attorney

H. M. CROWLEY.
VEHICLE WHEEL.
APPLICATION FILED AUG. 14, 1917.
1,272,920.
Patented July 16, 1918.
2 SHEETS—SHEET 2.
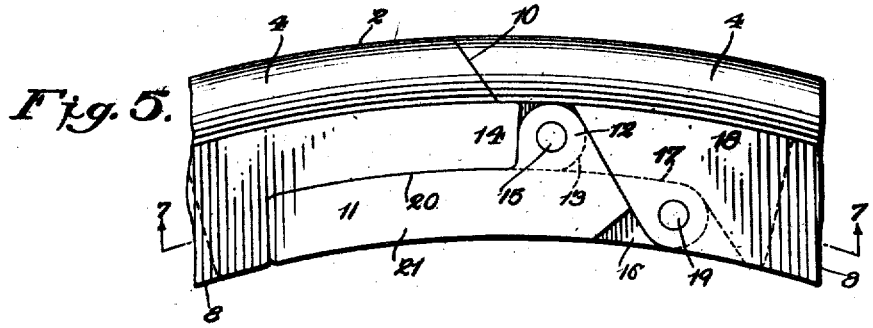
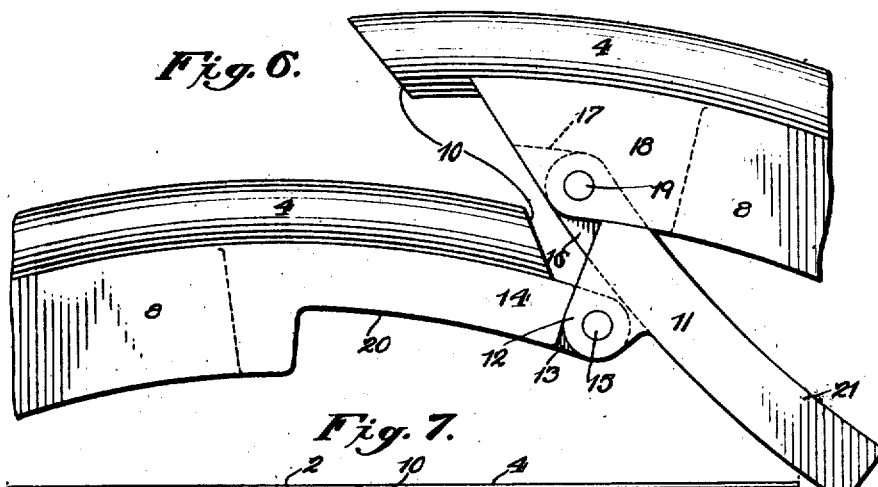
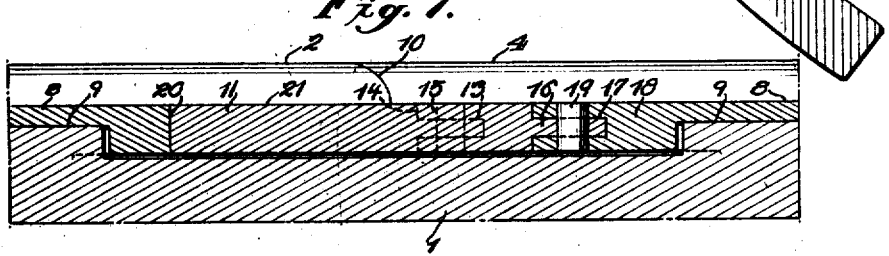
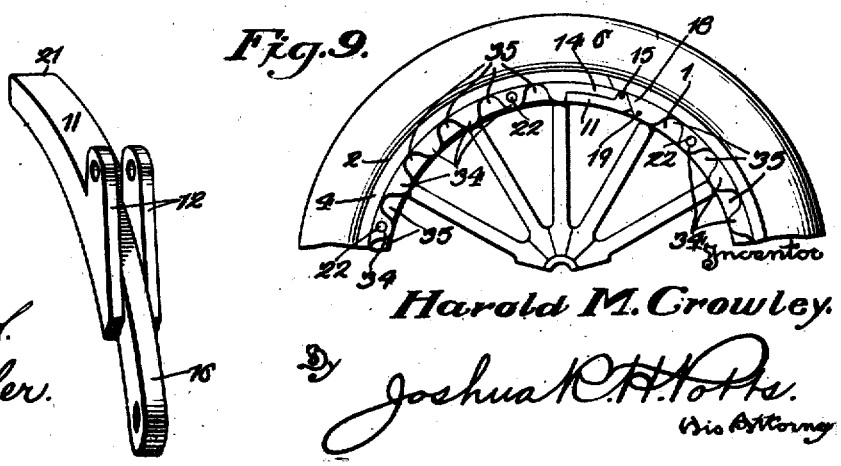

UNITED STATES PATENT OFFICE.

HAROLD M. CROWLEY, OF TUCKERTON, NEW JERSEY.

VEHICLE-WHEEL.

1,272,920. Specification of Letters Patent. Patented July 16, 1918.

Application filed August 14, 1917. Serial No. 186,085.

*To all whom it may concern:*

Be it known that I, HAROLD M. CROWLEY, a citizen of the United States, residing at Tuckerton, in the county of Ocean and State of New Jersey, have invented certain new and useful Improvements in Vehicle-Wheels, of which the following is a specification.

My invention consists of an improved vehicle wheel. One object of my invention is to construct a vehicle wheel in such manner that its tire-supporting rim can be easily and quickly contracted or reduced in diameter, so that a tire can be readily attached thereto or removed therefrom.

Another object is to so construct the parts of my improved wheel that when in their normal positions, they will be strong and capable of sufficiently holding the tire in position.

These objects, and other advantageous ends which will be described hereinafter, I attain in the following manner, reference being had to the accompanying drawings in which—

Fig. 5 is a fragmentary view on an enlarged scale of a portion of the tire-supporting rim.

Fig. 6 is a view of similar nature to that illustrated in Fig. 5 showing the rim moved into a position to permit the removal or application of a tire.

Fig. 7 is an inverted sectional plan view taken on the line 7—7 of Fig. 5.

Fig. 8 is a perspective view of an actuating lever which forms a part of my invention.

Fig. 9 is a fragmentary elevation showing a modified form of my invention.

Figure 1:
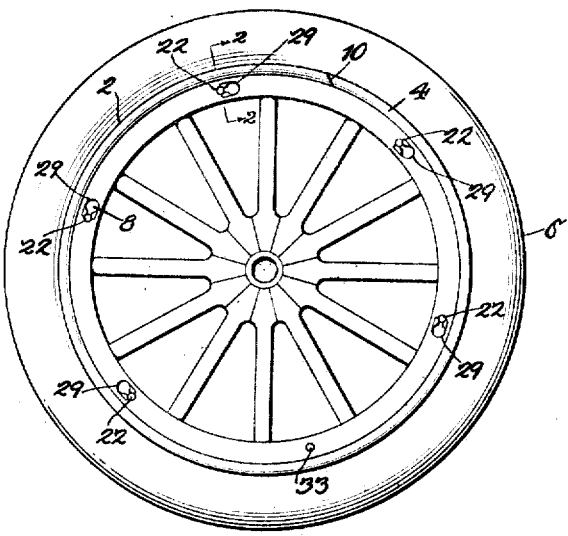
Figure 1 is a side elevation of a wheel constructed in accordance with my invention.
Figure 2:
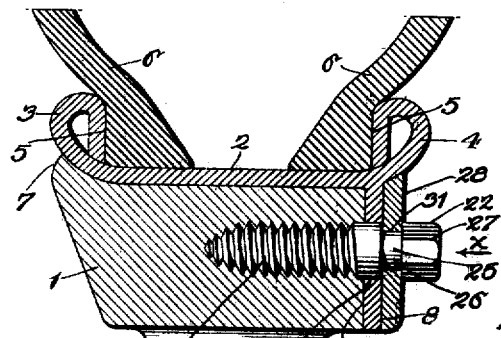
Fig. 2 is an enlarged section taken on the line 2—2 of Fig. 1.
Figure 3:
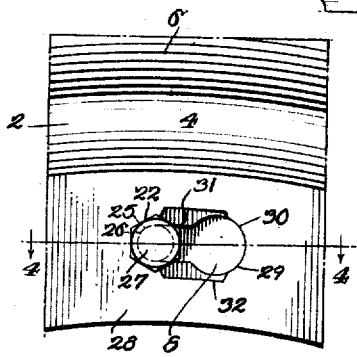
Fig. 3 is a fragmentary face view looking in the direction of the arrow "$x$", Fig. 2.
Figure 4:
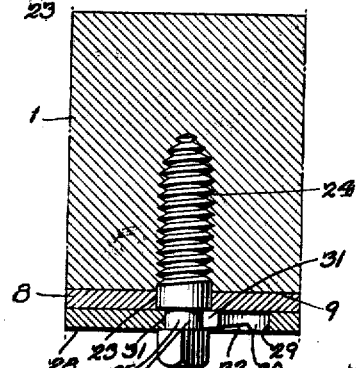
Fig. 4 is a section on the line 4—4 of Fig. 3.

Referring to Figs. 1 to 8 inclusive, 1 represents the felly of the wheel. A rim 2, preferably of resilient metal, engages the peripheral surface of the felly and has turned edges 3 and 4 adapted to embrace the edge portions 5 of a resilient tire 6.

The felly 1 has an annular portion 7 which provides an abutting flange for the turned edge 3 of the rim 2. The rim 2 has an inwardly extending flange 8 which abuts the side surface 9 of the felly 1 as clearly shown in Fig. 2. The rim 2 is split as shown at 10 in Figs. 5 and 6, and the flange 8 is interrupted in its length adjacent the split to provide room for the insertion of a lever 11.

This lever has two ears 12 which embrace a tongue 13 formed on the end portion 14 of the flange 8 adjacent the split 10. A pivot pin 15 serves to pivotally connect the ears 12 to the tongue 13 as clearly shown in Figs. 5 to 7 inclusive.

The lever 11 has an extension 16 which is pivotally mounted in a cavity 17 formed in the end portion 18 of the flange 8, a pivot pin 19 being used to form the pivotal connection. The end portion 14 of the flange 8 is cut out as shown at 20 to permit the handle 21 of the lever 11 to fit therein when the rim is in its normal position as shown in Fig. 5.

Bolts 22 extend through holes 23 in the flange 8 and have threaded portions 24 which extend into the body portion of the felly 1. Each of the bolts 22 has a groove 25 which provides a stem 26 of smaller cross section than the head 27.

A retaining ring 28 is adapted to engage the outer surface of the flange 8, and this retaining ring has a plurality of keyhole slots 29. The larger portion 30 of each of these keyhole slots is of sufficient diameter to freely pass over the head 27 of a respective bolt 22, and the smaller portion 31 of each of the slots 29 is of sufficient size that if the ring 28 is turned, the stem 26 of the bolt will engage through the portion 31 of the slot as clearly shown in Fig. 3.

The ring 28, at portions adjacent each of the slots 29, has a beveled recess 32, the function of which will be described hereinafter. The ring 28 is provided with an ordinary bolt hole through which a bolt 33 can be inserted after the ring 28 has been turned into a position so that all of the bolts 22 have their stem portions 26 engaging through the portions 31 of the slots 29.

When it is desired to remove the tire 6 from the rim 2, it is merely necessary to remove the single bolt 33 and turn the ring 28 until the large portions 30 of the slots 29 are in alinement with the heads of the bolts 22. The ring 28 can then be bodily moved over the heads of the bolts 22 and the entire rim with the tire thereon can be slid from the felly, it being noted that the holes 23 in the flange 8 are sufficiently large to pass over the said heads of the bolts 22. After the rim has been removed, the lever 11 can be manually moved into the position shown in Fig. 6, which will cause the rim 2 to be contracted and reduced in diameter. This difference in diameter is sufficient to permit the tire to be slid laterally off the rim. To apply a tire to the rim, the tire is slid over the rim while it is in a contracted state, after which the rim can be expanded to its normal circumference by moving the lever 11 through the medium of the handle 21 into the position shown in Fig. 5.

The rim with the tire thereon can be slid onto the felly and over the bolt heads 27. The ring 28 can then be attached by passing it over the bolt heads 27 and afterward slightly turning it so that the bolt 33 can be inserted. This locks the ring 28 since the heads of the bolts 22, being of larger cross section than the narrow portions of the slots 29, engage the outer surface of the flange 8 and hold the latter in place.

The beveled recesses 22 extend outwardly from the large portions 30 of the slots 29 and intersect the outer surface of the flange 8 adjacent the small portions 31 of said slots 29. This causes a clamping action and tightly binds the ring 28 against the outer surface of the flange 8.

In the form of my invention shown in Fig. 9, instead of having a continuous flange, I make the flange in the form of a series of fluted lips 34, the spaces 35 between the lips permitting the rim 2 to bend freely when the lever 11 is actuated. In all other respects the form of my invention illustrated in Fig. 9 is similar to that illustrated in Figs. 1 to 8 inclusive, and I have therefore given similar parts corresponding reference numerals.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A wheel including a tire-supporting rim split within its circumference, a flange extending inwardly from said rim and being interrupted within its length to provide a recess, a lever positioned within said recess, said lever having portions respectively pivoted to the ends of said flange adjacent the recess, substantially as described.

2. A wheel including a tire-supporting rim split within its circumference, a flange extending inwardly from said rim and being interrupted within its length to provide a recess, a lever positioned within said recess, said lever having ears spaced apart, a tongue on one of the end portions of said flange adjacent the recess, said tongue extending between said ears, a pivot for said tongue and ears, an extension on said lever fitting within a cavity in the opposite end portion of said flange, and a pivot connecting said extension within the cavity, substantially as described.

3. A wheel including a tire-supporting rim split within its circumference, a flange extending inwardly from said rim and being interrupted within its length to provide a recess, a lever positioned within said recess, said lever having portions respectively pivoted to the ends of said flange adjacent the recess, means on said lever providing a handle, one of said end portions of the flange being cut away to receive said handle of the lever, substantially as described.

4. A wheel including a tire-supporting rim split within its circumference, a flange extending inwardly from said rim and being interrupted within its length to provide a recess, a lever positioned within said recess, said lever having portions respectively pivoted to the ends of said flange adjacent the recess, said flange being interrupted throughout its length to provide spaces to permit the ready bending of the rim, substantially as described.

In testimony whereof I have signed my name to this specification in the presence of two subscribing witnesses.

HAROLD M. CROWLEY.

Witnesses:
JOB M. SMITH,
ELLA CROWLEY.